United States Patent
Tobin

(10) Patent No.: US 8,250,761 B2
(45) Date of Patent: Aug. 28, 2012

(54) METHODS OF MANUFACTURING ROTOR BLADES FOR A WIND TURBINE

(75) Inventor: James Robert Tobin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/966,219

(22) Filed: Dec. 13, 2010

(65) Prior Publication Data

US 2011/0223032 A1    Sep. 15, 2011

(51) Int. Cl.
*B32B 38/10*    (2006.01)
*F04D 29/38*    (2006.01)

(52) U.S. Cl. ............... 29/889.7; 29/889.71; 416/229 R; 416/226

(58) Field of Classification Search .................. 416/226, 416/229 R, 230, 239; 29/889.7, 889.71, 29/458
See application file for complete search history.

(56) References Cited

U.S. PATENT DOCUMENTS

| | | | |
|---|---|---|---|
| 4,260,332 A * | 4/1981 | Weingart et al. | 416/226 |
| 4,412,784 A * | 11/1983 | Wackerle et al. | 416/230 |
| 4,494,910 A * | 1/1985 | Hahn et al. | 416/226 |
| 5,489,228 A | 2/1996 | Richardson et al. | |
| 5,632,602 A * | 5/1997 | Herrmann et al. | 416/226 |
| 6,305,905 B1 * | 10/2001 | Nagle et al. | 416/204 R |
| 2008/0069699 A1 | 3/2008 | Bech | |
| 2009/0162208 A1 | 6/2009 | Zirin et al. | |
| 2009/0264034 A1 | 10/2009 | Gasparro | |
| 2010/0028159 A1 | 2/2010 | Brown | |

FOREIGN PATENT DOCUMENTS

EP    1707805    10/2006

OTHER PUBLICATIONS

Pirsch, Stephen, "How to Build Your First Surfboard", pp. 1-8, www.surfersteve.com/polystyrene.htm 2003.

* cited by examiner

*Primary Examiner* — Edward Look
*Assistant Examiner* — Ryan Ellis
(74) *Attorney, Agent, or Firm* — Dority & Manning, P.A.

(57) ABSTRACT

A method of manufacturing a rotor blade for a wind turbine and a rotor blade manufactured in accordance with such method are disclosed. The method generally comprises providing a blade blank formed at least partially from a filler material, shaping the blade blank to form a profile of the rotor blade and positioning a skin around an outer perimeter of the shaped blade blank.

16 Claims, 7 Drawing Sheets

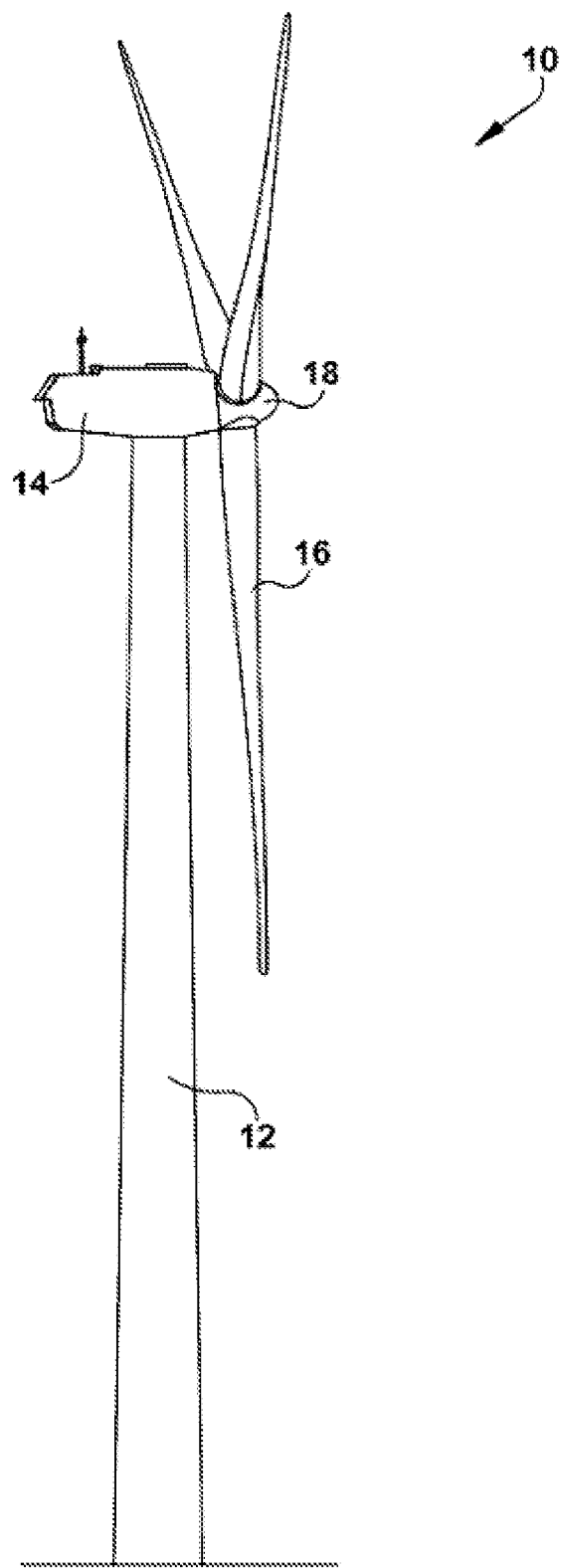
FIG. -1-

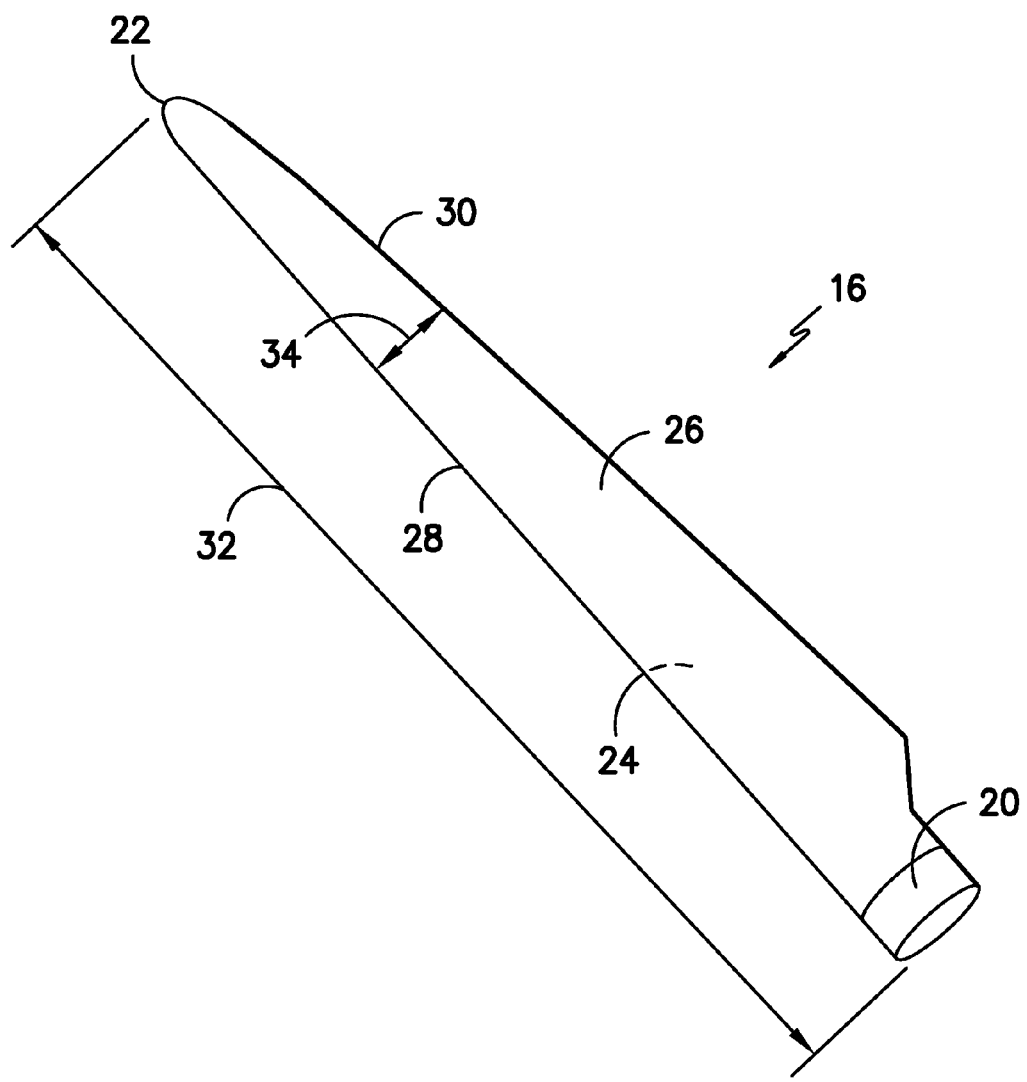
FIG. −2−

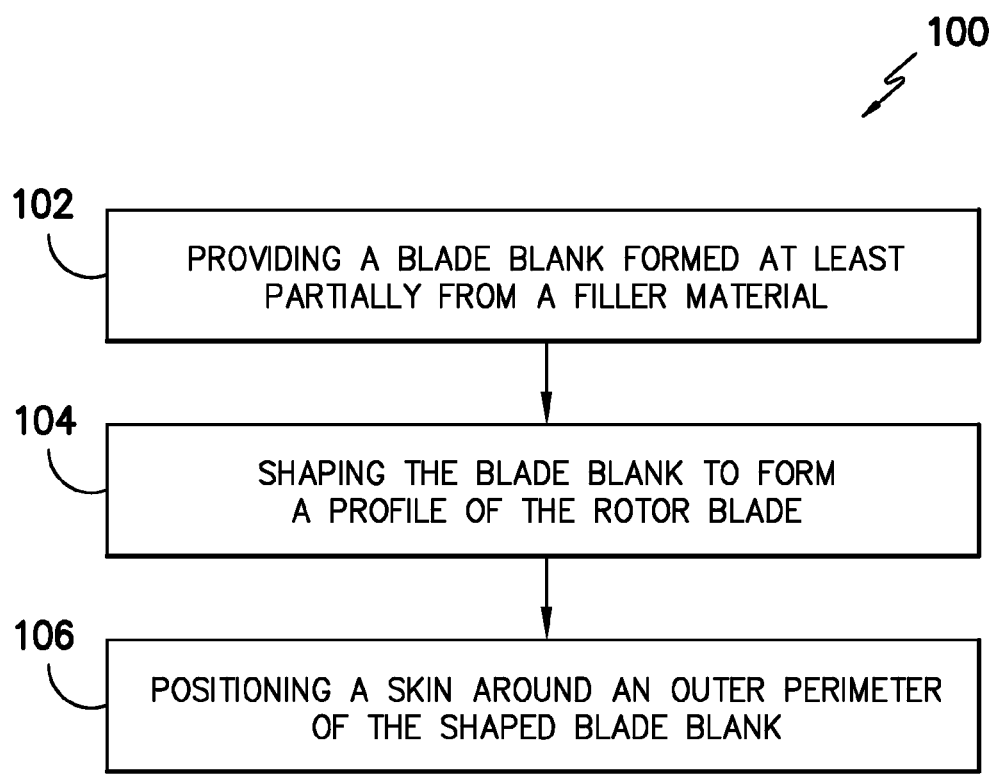
FIG. -3-

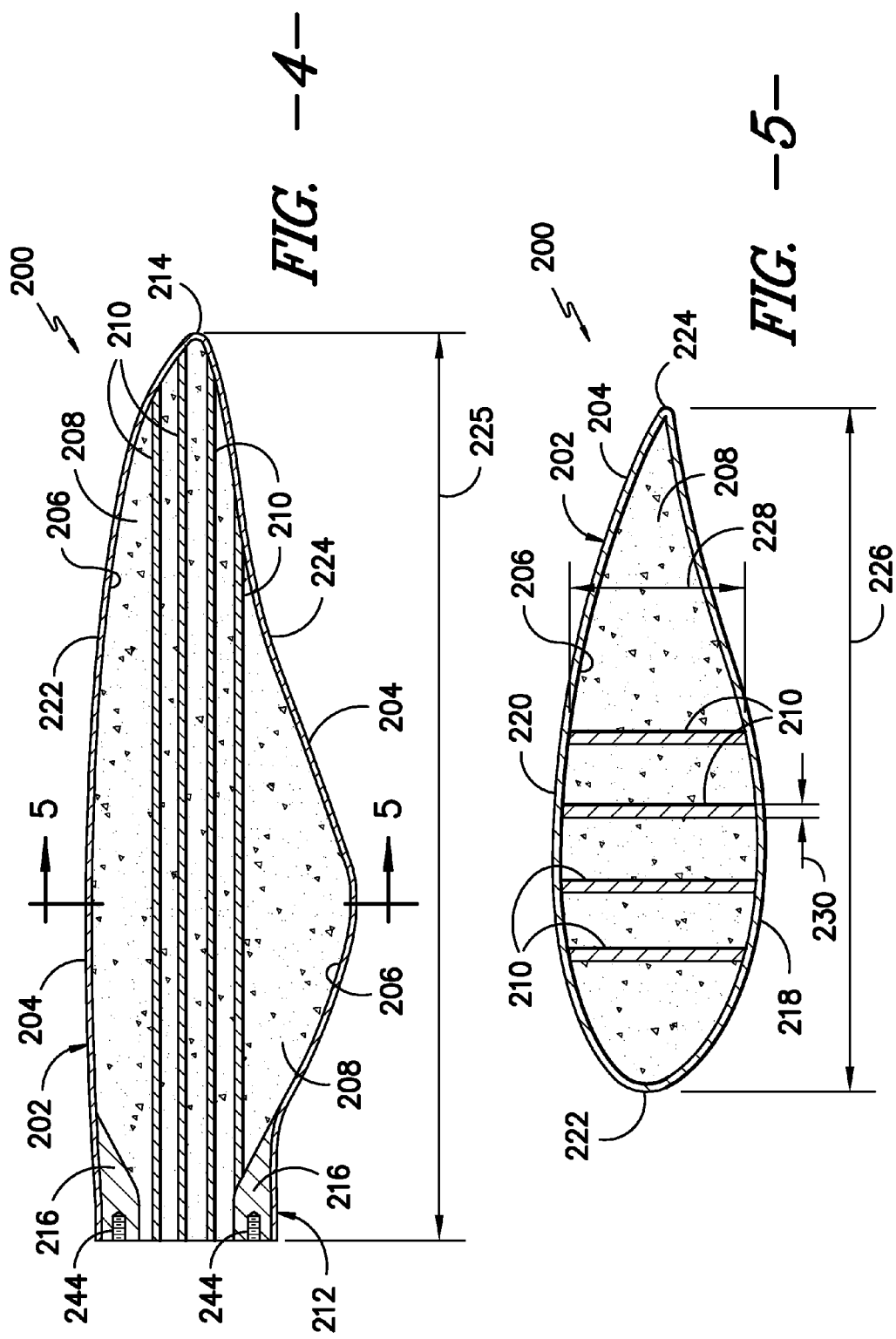

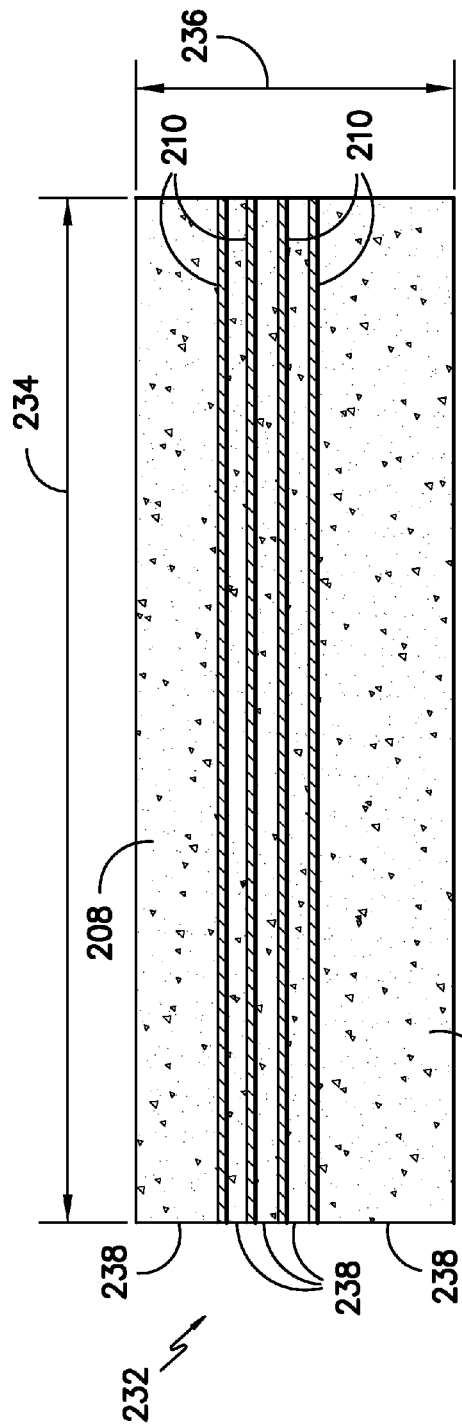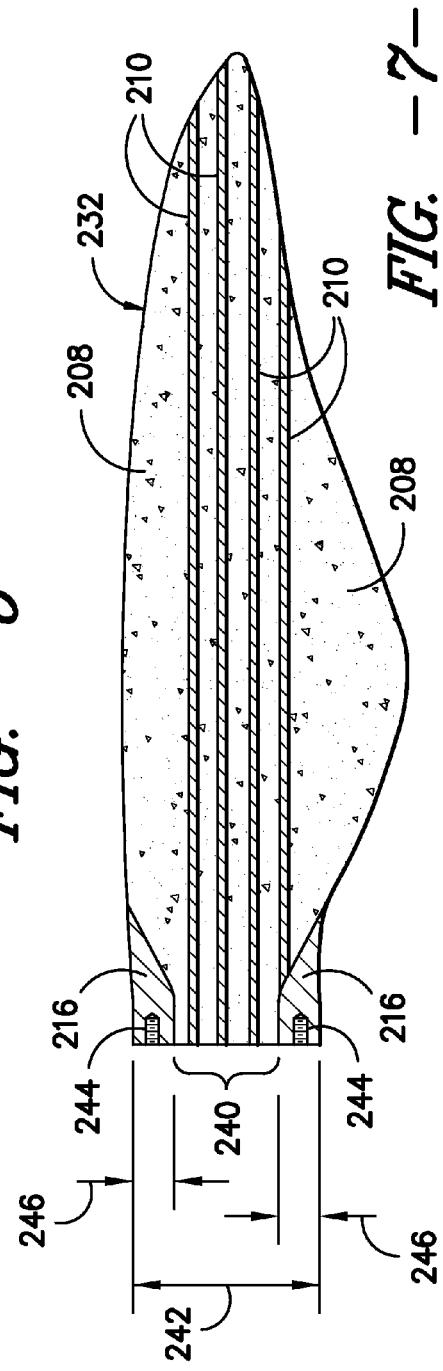

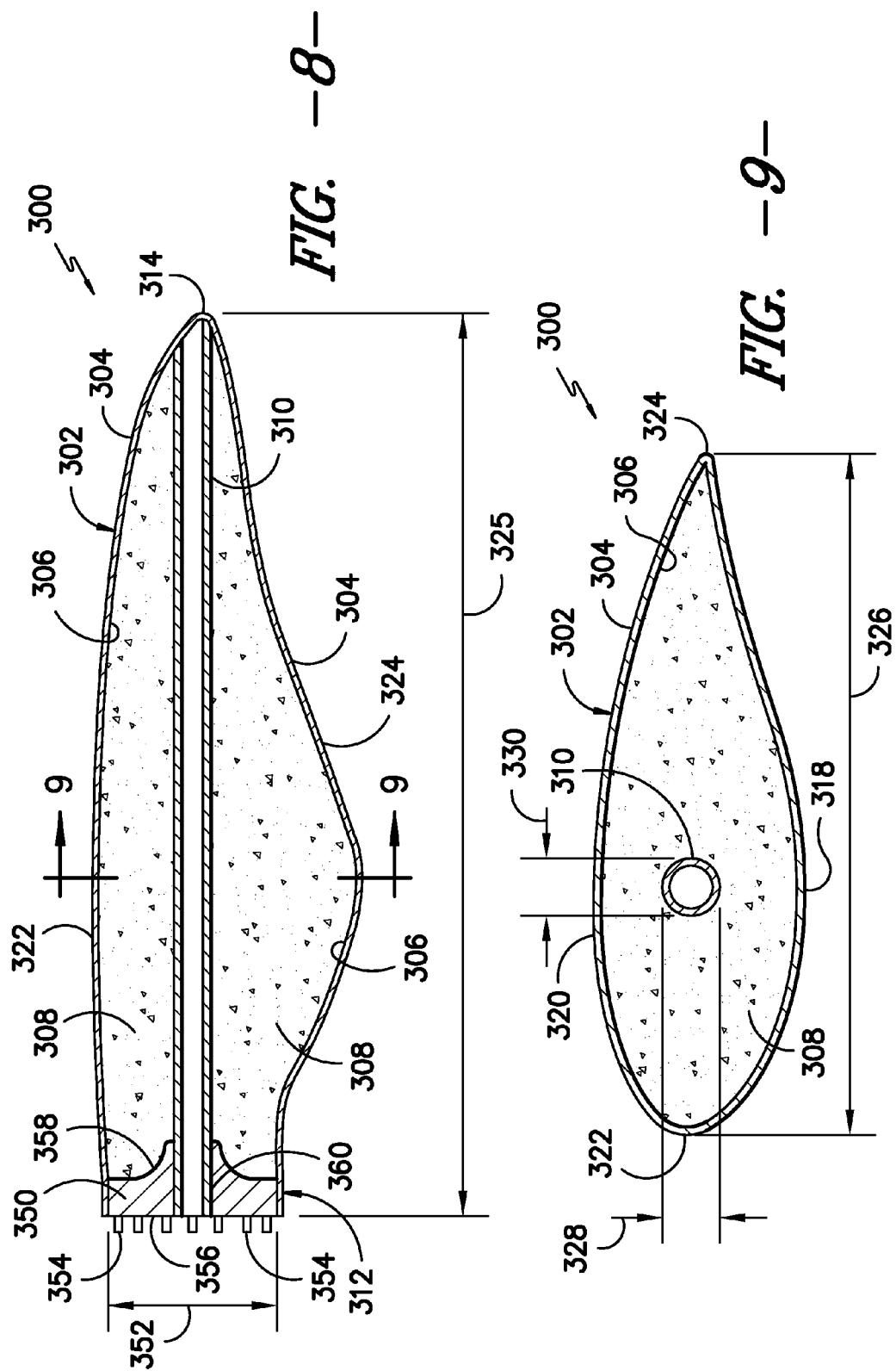

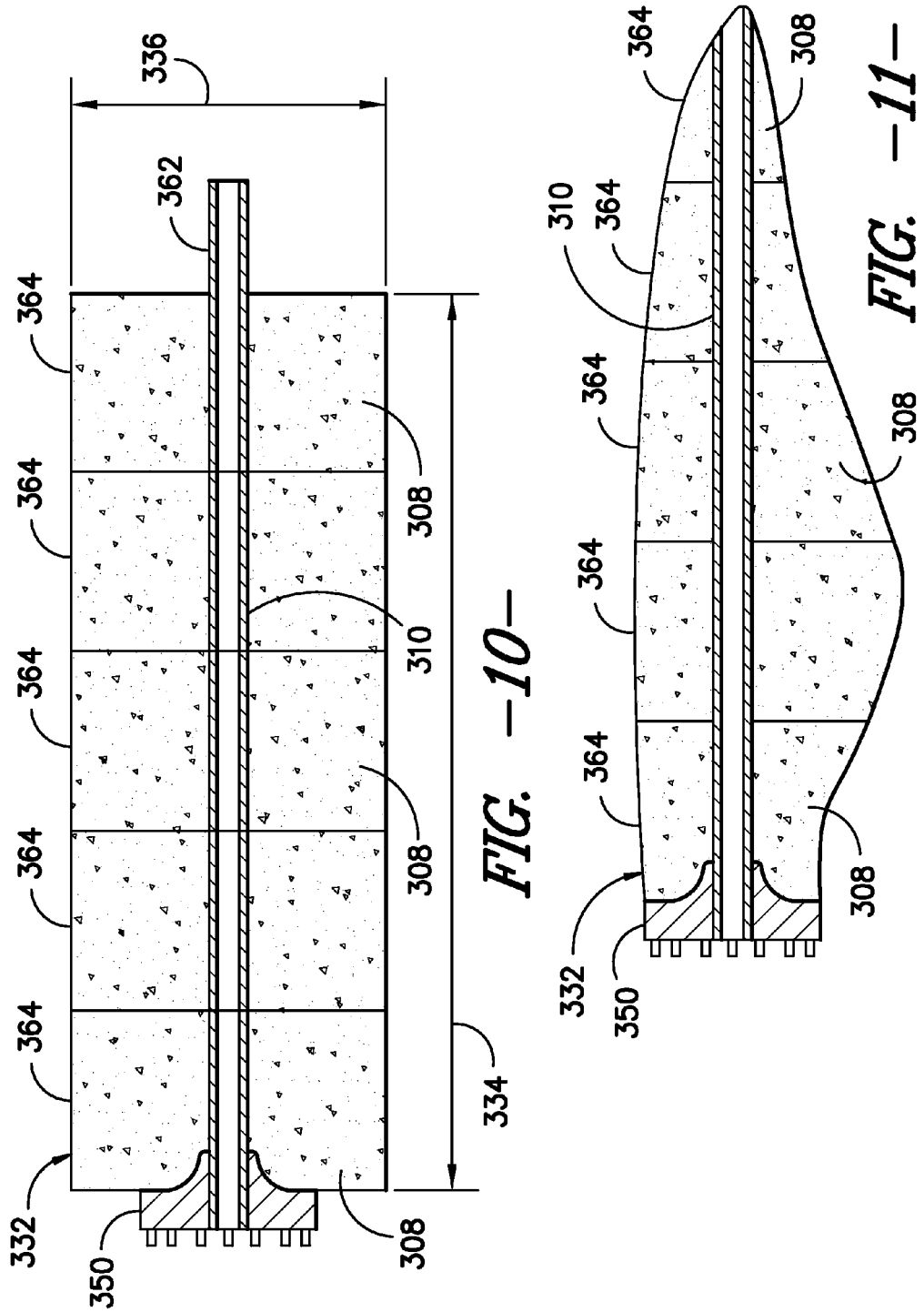

METHODS OF MANUFACTURING ROTOR BLADES FOR A WIND TURBINE

FIELD OF THE INVENTION

The present subject matter relates generally to wind turbines and, more particularly, to methods of manufacturing rotor blades for a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

In manufacturing rotor blades, it is generally necessary that specialized tooling and/or molds be used. For example, the blade halves of a conventional rotor blade are typically formed in large molds that are custom made for the particular size and shape of the rotor blade being produced. Accordingly, new molds must be purchased or otherwise made for each rotor blade size and shape being produced, which greatly increases the productions costs of rotor blades. In addition, conventional methods of forming the blade halves of a rotor blade typically include the use of a layup process wherein plies of reinforcing material are hand-placed into the custom made molds. This process is very laborious and greatly increases the time required to produce a rotor blade.

Accordingly, there is a need for improved methods of manufacturing wind turbine rotor blades that reduce production costs and increase the speed at which rotor blades may be produced.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method of manufacturing a rotor blade for a wind turbine. The method generally comprises providing a blade blank formed at least partially from a filler material, shaping the blade blank to form a profile of the rotor blade and positioning a skin around an outer perimeter of the shaped blade blank.

In another aspect, the present subject matter discloses a rotor blade for a wind turbine. The rotor blade generally includes a support member extending at least partially between a root and a tip of the rotor blade. The rotor blade also includes a skin defining an exterior surface of the rotor blade. Additionally, a filler material may extend between the support member and the skin and may define a profile of the rotor blade.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of a conventional wind turbine;

FIG. 2 illustrates a perspective view of a conventional rotor blade;

FIG. 3 illustrates a flow diagram of one embodiment of a method of manufacturing a rotor blade in accordance with aspects of the present subject matter;

FIG. 4 illustrates a cross-sectional, spanwise view of one embodiment of a rotor blade manufactured in accordance with aspects of the present subject matter;

FIG. 5 illustrates a cross-sectional, chordwise view of the rotor blade illustrated in FIG. 4;

FIG. 6 illustrates a cross-sectional view of a blade blank suitable for use in manufacturing the rotor blade illustrated in FIG. 4;

FIG. 7 illustrates a cross-sectional view of the blade blank illustrated in FIG. 6 after it has been shaped in accordance with aspects of the present subject matter;

FIG. 8 illustrates a cross-sectional, spanwise view of another embodiment of a rotor blade manufactured in accordance with aspects of the present subject matter;

FIG. 9 illustrates a cross-sectional, chordwise view of the rotor blade illustrated in FIG. 8;

FIG. 10 illustrates a cross-sectional view of a blade blank suitable for use in manufacturing the rotor blade illustrated in FIG. 8; and, FIG. 11 illustrates a cross-sectional view of the blade blank illustrated in FIG. 10 after it has been shaped in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to improved methods of manufacturing rotor blades for wind turbines and also rotor blades produced in accordance with such methods. In particular, the disclosed rotor blades may be manufactured by providing a blade blank composed of a filler material. The blade blank may generally be machined or otherwise shaped into the aerodynamic shape or profile of the rotor blade. An outer skin may then be applied to an outer perimeter of the shaped blade blank to form the exterior surface of the rotor blade and to provide a protective coating for the filler material.

Accordingly, the disclosed methods generally provide for the manufacture of rotor blades without the use of specialized tooling and molds and without the laborious process of hand laying laminate plies within such molds. As such, the manufacturing costs and time required to produce a rotor blade may be reduced significantly, thereby improving the efficiency of the development of new rotor blade designs and increasing the speed at which rotor blades may be supplied to the marketplace.

Referring to the drawings, FIG. 1 illustrates perspective view of a wind turbine 10 of conventional construction. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Referring now to FIG. 2, there is illustrated a perspective view of a rotor blade 16 of conventional construction. As shown, the rotor blade 16 includes a blade root 20 configured for mounting the rotor blade 16 to a mounting flange (not shown) of the wind turbine hub 18 (FIG. 1) and a blade tip 22 disposed opposite the blade root 20. The rotor blade 16 may also include a pressure side 24 and a suction side 26 extending between a leading edge 28 and a trailing edge 30. Additionally, the rotor blade 16 may include a span 32 defining the total length between the blade root 20 and the blade tip 22 and a chord 34 defining the total length between the leading edge 28 and the trailing edge 30. As is generally understood, the chord 34 may vary in length with respect to the span 32 as the rotor blade 16 extends from the blade root 20 to the blade tip 22.

Additionally, the rotor blade 16 may define any suitable aerodynamic profile. Thus, in several embodiments, the rotor blade 16 may define an airfoil shaped cross-section. For example, the rotor blade 16 may be configured as a symmetrical airfoil or a cambered airfoil. Further, the rotor blade 16 may also be aeroelastically tailored. Aeroelastic tailoring of the rotor blade 16 may entail bending the blade 16 in a generally chordwise direction and/or in a generally spanwise direction. The chordwise direction generally corresponds to a direction parallel to the chord 34 defined between the leading and trailing edges 28, 30 of the rotor blade 16. Additionally, the spanwise direction generally corresponds to a direction parallel to the span 32 of the rotor blade 16. Aeroelastic tailoring of the rotor blade 16 may further entail twisting of the blade 16, such as by twisting the blade 16 in a generally chordwise or spanwise direction.

As indicated above, the present subject matter is generally directed to methods of manufacturing rotor blades for a wind turbine and also rotor blades produced in accordance with such methods. Accordingly, one embodiment of a method 100 for manufacturing a rotor blade will generally be described with reference to FIG. 3 and will be explained in greater detail with reference to FIGS. 4-11. Additionally, one embodiment of a rotor blade 200 produced in accordance with the illustrated method 100 will generally be described with reference to FIGS. 4-7. Further, another embodiment of a rotor blade 300 produced in accordance with the illustrated method 100 will generally be described with reference to FIGS. 8-11.

Referring to FIG. 3, in one embodiment, the disclosed method 100 generally includes providing a blade blank formed at least partially from a filler material 102, shaping the blade blank to form a profile of the rotor blade 104 and positioning a skin around an outer perimeter of the shaped blade blank 106. As indicated above, such a method 100 may generally provide for a reduction in both the production costs and the amount of time required to manufacture a rotor blade. Accordingly, new rotor blade designs may be produced with greater efficiency, thereby improving product development and increasing the speed at which rotor blades may be supplied to the marketplace. It should be appreciated that, although the various method elements 102, 104, 106 illustrated in FIG. 3 are shown in a particular order, the elements may generally be performed in any sequence and/or order consistent with the disclosure provided herein.

Referring now to FIGS. 4 and 5, there is illustrated one embodiment of a rotor blade 200 manufactured in accordance with aspects of the present subject matter. In particular, FIG. 4 illustrates a cross-sectional, spanwise view of the rotor blade 200. FIG. 5 illustrates a cross-sectional, chordwise view of the rotor blade 200.

As shown, the rotor blade 200 generally includes a cover skin 202 having an outer surface 204 defining the exterior surface of the rotor blade 200 and an inner surface 206 generally outlining the outer perimeter of a volume of shaped filler material 208 disposed within the interior of the rotor blade 200. The shaped filler material 208 may generally be configured to have a shape or profile corresponding to the aerodynamic shape or profile of the rotor blade 200, such as by shaping a blade blank 232 (FIG. 6) formed from the filler material 208. Thus, it should be appreciated that the cover skin 202 may generally be configured to conform to the profile of the shaped filler material 208 such that the outer surface 204 of the cover skin 202 generally defines the aerodynamic profile of the rotor blade 200. The rotor blade 200 may also include a plurality of support members 210 extending within the rotor blade 200 in a generally spanwise direction, such as from generally adjacent the blade root 212 to generally adjacent the blade tip 214. Moreover, the rotor blade 200 may include a root sleeve 216 disposed at the blade root 212 which generally extends between the shaped filler material 208 and the cover skin 202.

Additionally, similar to the rotor blade 16 described above, the disclosed rotor blade 200 may include a pressure side 218 and a suction side 220 extending between a leading edge 222 and a trailing edge 224. Further, the rotor blade 200 may include a span 225 defining the total length between the blade root 212 and the blade tip 214 and a chord 226 defining the total length between the leading edge 222 and the trailing edge 224. Moreover, as indicated above, the rotor blade 200 may generally define an aerodynamic profile. For example, in several embodiments, the filler material 208 and the cover skin 202 may be configured such that the rotor blade 200 defines an airfoil shaped cross-section, such as a symmetrical or cambered airfoil. The rotor blade 200 may also be configured to have additional aerodynamic features. For example, in one embodiment, the rotor blade 200 may be aeroelastically tailored, such as by being bent and/or twisted in a generally chordwise direction and/or in a generally spanwise direction.

As indicated above, the filler material 208 of the disclosed rotor blade 200 may generally be disposed throughout the interior of the blade 200. In particular, the filler material 208 may be configured to extend between each of the support members 210 and/or between the support members 210 and the cover skin 202 so as to occupy or fill at least a portion of the inner volume of the rotor blade 200. As used herein with reference to FIGS. 4-7, the term "inner volume" refers to the volume of the rotor blade 200 defined by the inner surfaces 206 of the cover skin 202 which is not otherwise occupied by the support member(s) 210 and the root sleeve 216. In several embodiments, the filler material 208 may be configured to occupy a substantial portion of the inner volume of the rotor blade 200. For example, the filler material may be configured to occupy greater than 50% of the inner volume of the rotor blade 200, such as greater than 75% of the inner volume or greater than 85% of the inner volume or greater than 95% of the inner volume.

It should be appreciated that the filler material 208 may generally comprise any suitable material which is capable of being machined or otherwise shaped into the aerodynamic profile of the rotor blade 200. For example, in several embodiments of the present subject matter, the filler material 208 may comprise a relatively lightweight, low-density material. Thus, in a particular embodiment, the filler material 208 may comprise a low-density foam or core material. Suitable low-density foam materials may include, but are not limited to, polystyrene foams (e.g., expanded polystyrene foams), polyurethane foams, other foam rubbers/resin-based foams and various other open cell and closed cell foams. Alternatively, the filer material 208 may comprise other suitable low-density materials, such as balsa wood, cork and the like.

Referring still to FIGS. 4 and 5, the support members 210 may generally be configured as structural components for the disclosed rotor blade 200. For example, the support members 210 may be configured to provide support for the filler material 208 during manufacturing of the rotor blade 200. Additionally, the support members 210 may be configured to provide stiffness and/or strength (e.g., spanwise or flapwise stiffness and/or strength) to the rotor blade 200 during operation of the wind turbine 10. Thus, it should be appreciated that the support members 210 may generally have any suitable shape, size, cross-section and/or configuration that permits the support members 210 to function as described herein.

In particular, in several embodiments, the support members 210 may be configured to extend lengthwise within the rotor blade 200 along at least a portion of the span 225 of the rotor blade 200. For example, in the illustrated embodiment, the support members 210 may be configured to extend lengthwise within the rotor blade 200 from generally adjacent the blade root 212 to generally adjacent the blade tip 214. Additionally, as shown, the support members 210 may be configured as a solid (i.e., non-hollow) structural component defining a rectangular cross-sectional shape. However, it should be appreciated that, in alternative embodiments, the support members 210 may generally be configured as solid and/or hollow components defining any suitable cross-sectional shape, such as a circular, elliptical, triangular or square shape. In further embodiments, the support members 210 may be configured as "I" beams or may have any other suitable support beam configuration known in the art. For instance, in a particular embodiment of the present subject matter, the support members 210 may have a configuration similar to the spar cap/shear web configuration utilized in conventional rotor blades.

Additionally, the support members 210 may generally define any suitable height 228 and chordwise width 230 within the rotor blade 200. For example, in the illustrated embodiment, each of the support members 210 may define a height 228 extending generally between the pressure and suction sides 218, 220 of the blade 200, such as by extending between the inner surfaces 206 of the cover skin 202. Moreover, in another embodiment, the support members 210 may be oriented within the rotor blade 200 perpendicular to the orientation shown in FIG. 5 (i.e., in the chordwise direction). In such an embodiment, the chordwise widths 230 of the support members 210 may be configured to extend between the leading and trailing edges 222, 224 of the rotor blade 200.

Further, the support members 210 may generally be formed from any suitable material. However, in several embodiments of the present subject matter, the support members 210 may be formed from a relatively stiff and/or durable material so as to provide stiffness and/or strength to the rotor blade 200. For example, the support members 210 may be formed from any suitable laminate composite materials (e.g., fiber-reinforced laminates), polymers (e.g., high strength plastics), metals (e.g., aluminum), wood or any other suitable materials or combinations of materials. Additionally, it should be appreciated that, although the disclosed rotor blade 200 is depicted as including four support members 210, the rotor blade 200 may generally include any number of support members 210, such as three or fewer support members 210 or five or greater support members 210.

Referring now to FIG. 6, there is illustrated a cross-sectional view of one embodiment of a blade blank 232 for use in manufacturing the rotor blade 200 illustrated in FIGS. 4 and 5. In general, the blade blank 232 may comprise a volume or block of filler material 208 configured to be machined or otherwise shaped into the aerodynamic profile of the rotor blade 200. Thus, it should be appreciated that, in several embodiments, the blade blank 232 may generally define any suitable shape having dimensions equal to or greater than the span 225, maximum chord 226 and maximum height (i.e., the maximum height between the pressure and suction sides 218, 220) of the rotor blade 200 such that portions of the filler material 208 forming the blade blank 232 may be removed in order to define the profile of the rotor blade 200. For instance, in one embodiment, the length 234 of the blade blank 232 may generally be equal to or greater than the span 225 of the rotor blade 200. Similarly, the width 236 of the blank 232 may generally be equal to or greater than the maximum chord 226 of the rotor blade 200 and the height (a dimension into the page) of the blank 232 may generally be equal to or greater than the maximum height (not shown) of the rotor blade 200.

A shown in FIG. 6, in one embodiment, the blade blank 232 may be configured as a layered construction, with the plurality of support members 210 of the rotor blade 200 being disposed between a plurality of filler material segments 238 comprising individual blocks or sections of the filler material 208. In general, the layered construction of the blade blank 232 may be assembled or otherwise formed using any suitable means and/or method known in the art. Thus, in several embodiments, the filler material segments 238 and support members 210 may comprise separate, pre-manufactured components which may be secured or otherwise assembled together to form the blade blank 232. For example, the filler material segments 238 and the support members 210 may be bonded, adhered, tied, fastened or otherwise attached to one another using any suitable means. Alternatively, the support members 210 may be formed directly onto or within the filler material segments 238. For instance, in one embodiment, the support members 210 may be formed by applying or otherwise assembling a plurality of layers of a laminate composite material directly onto a filler material segment 238. Once the support member 210 has been formed onto the filler material segment 238, another filler material segment 238 may then be assembled on top of the support member 210, with the process being repeated to form the entire blade blank 232.

It should be appreciated that the width of each filler material segment 232 and the spacing between the support members 210 may generally vary between different blade blanks 232 depending on numerous factors including, but not limited to, the size (e.g., the chordwise width 230) and the amount of support members 210 desired to be included within the rotor blade 200. Additionally, it should be appreciated that, in one embodiment, the support members 210 may be equally spaced from one another within the blade blank 232. Alternatively, the spacing between each of the support members 210 may be varied. For example, each of the filler material segments 238 may define a differing width such that the spacing between the support members 210 is varied within the blade blank 232 and, thus, within the rotor blade 200.

It should also be appreciated that, in alternative embodiments, the blade blank 232 need not be configured as a layered construction having a plurality of separate filler material segments 238. For example, in one embodiment, the blade blank 232 may comprise a single, continuous volume of filler material 208. In such an embodiment, the blade blank 232 may be configured such that the support members 210 may be inserted or otherwise appropriately positioned within the blade blank 232.

Referring now to FIG. 7, there is illustrated a cross-sectional, spanwise view of one embodiment of the blade blank 232 illustrated in FIG. 6 after it has been shaped into the aerodynamic profile of the rotor blade 200. Specifically, as indicated above, portions of the filler material 208 forming the blade blank 232 may be removed in order to define the profile of the rotor blade 200. For example, in several embodiments the blade blank 232 may be machined or otherwise shaped to form the aerodynamic contours and profile of the pressure side 218, suction side 220, leading edge 222 and trailing edge 224 of the rotor blade 200.

In general, the blade blank 232 may be shaped into the desired profile using any suitable shaping means/method known in the art. For instance, in one embodiment, the blade blank 232 may be machined using any suitable machining process and/or any suitable machining equipment, such as a computer numerical control (CNC) machine or any other precision machining equipment. Alternatively, the blade blank 232 may be shaped using other suitable tools and/or equipment, such as various different manual and powered hand tools. For example, the blade blank 232 may be shaped using cutting tools (e.g., knives, saws and the like), grinding/sanding equipment (e.g., electrical grinders, electrical sanders, sand paper and the like) and/or any other suitable tools/equipment known in the art.

It also should be appreciated that, in an alternative embodiment of the present subject matter, one or more of the filler material segments 238 may be pre-machined or pre-formed into the profile of the rotor blade 200 prior to being assembled into the blade blank 232. For example, in the illustrated embodiment, each of the filler material segments 238 may be pre-machined to define a portion of the aerodynamic profile of the rotor blade 200 such that, once the blade blank 232 is formed (e.g., by assembling the filler material segments 238 and the support members 210), a complete aerodynamic shape or profile is formed without the necessity of performing an additional machining and/or shaping process.

Referring still to FIG. 7, as indicated above, the disclosed rotor blade 200 may also include a root sleeve 216 disposed at the blade root 212 of the rotor blade 200. In particular, the root sleeve 216 may be disposed between the cover skin 202 and a root end 240 of the shaped blade blank 232. The root sleeve 216 may generally serve as an attachment mechanism for attaching the rotor blade 200 to the hub 18 (FIG. 1) of a wind turbine 10. Thus, it should be appreciated that the root sleeve 216 may generally be designed to have any suitable size, shape and/or configuration that permits the root sleeve 216 to be attached to a wind turbine hub 18. For example, in one embodiment, the root sleeve 216 may define a substantially cylindrical or circular shape having a diameter or height 242 generally corresponding to the diameter or height of the mounting flange (not shown) of the hub 18. Additionally, the root sleeve 216 may include a plurality of annularly spaced holes 244 which define a bolt hole pattern generally corresponding to a bolt hole pattern defined in the hub 18. In another embodiment, a plurality of threaded rods (not shown) may be disposed within the annularly spaced holes 244 to permit attachment of the rotor blade 200 to the wind turbine hub 18. Of course, it should be appreciated that the root sleeve 216 may be configured to be attached to the hub 18 using any other suitable means known in the art.

Additionally, the root sleeve 216 may generally be formed from any suitable material. However, in several embodiments, the root sleeve 216 may be formed from a relatively stiff and/or durable material. For example, the root sleeve may be formed from any suitable laminate composite materials (e.g., fiber-reinforced laminates), polymers (e.g., high strength plastics), metals (e.g., aluminum), wood or any other suitable materials or combinations of materials which are capable of withstanding the loading that typically occurs along the attachment point of the hub 18 and the rotor blade 200 during operation of a wind turbine 10. Additionally, in one embodiment, the root sleeve 216 may comprise a pre-manufactured component which is configured to be assembled onto the root end 240 of the shaped blade blank 232. Alternatively, the root sleeve 216 may be formed directly onto the root end 240 of the shaped blade blank 232. For example, in a particular embodiment of the present subject matter, the root sleeve 216 may be formed by applying or otherwise assembling a plurality of layers of a laminate composite material directly onto the root end 240.

It should be appreciated that the root end 240 of the blade blank 232 may generally be machined or otherwise shaped so as to accommodate the root sleeve 216. For example, in one embodiment, an additional amount of filler material 208 corresponding to the width 246 of the root sleeve 216 may be removed from blade blank 232 at the root end 240 to permit the root sleeve 216 to be subsequently positioned, assembled or formed onto the root end 240. Additionally, in particular embodiment, the width 246 of the root sleeve 216 may generally taper as the root sleeve 216 extends away from the blade root 212. Thus, as shown in FIG. 7, the root end 240 of the blade blank 232 may generally be machined or otherwise shaped to include a corresponding tapered profile in order to accommodate the tapered width 246 of the root sleeve 216.

It should also be appreciated that, in several embodiments of the present subject matter, the entire aerodynamic profile of the rotor blade 200 need not be initially machined or otherwise formed into blade blank 232. For example, in one embodiment, only the root end 240 of the blade blank 232 may be initially machined or otherwise formed. In such an embodiment, the root sleeve 216 may be positioned, assembled or formed onto the root end 240 prior to the remainder of the rotor blade profile being formed in the blade blank 232.

Referring back to FIGS. 4 and 5, as indicated above, the rotor blade 200 may also include a cover skin 202 defining the exterior surface of the rotor blade 200. In general, the cover skin 202 may be configured to conform to and be disposed around the outer perimeter of the shaped blade blank 232 and the root sleeve 216 such that a smooth, aerodynamic profile is defined by the rotor blade 200. Additionally, as an outer coating for the shaped blade blank 232, the cover skin 202 may provide support as well as protection to the filler material 208 (e.g., impact protection).

It should be appreciated that the cover skin 202 may generally comprise any suitable material and may be formed using any suitable method and/or process. For example, in one embodiment, the cover skin 202 may comprise a laminate composite material (e.g., a fiber-reinforced laminate) formed around the outer perimeter of the shaped blade blank 232 and the root sleeve 216 using a hand layup process or any other suitable laminate forming method. In another embodiment, the cover skin 202 may comprise a spray-on surface coating, such as a polyurethane elastomeric spray-on compound. In a further embodiment, the cover skin 202 may comprise a thermoplastic-based coating formed using a heat-shrink wrapping process and/or a heat-shrink tubing process.

It should also be appreciated that, in several embodiments, the cover skin 202 may be positioned onto the outer perimeter of the shaped blade blank 232 one side at a time. For example, in a particular embodiment of the present subject matter, only the profile of the pressure or suction side 218, 220 of the rotor blade 200 may be initially machined or shaped into the blade blank 232. In such an embodiment, the cover skin 202 may then be applied to the formed pressure or suction side 218, 220 prior to the machining or shaping of the remainder of the rotor blade profile.

Referring now to FIGS. 8 and 9, there is illustrated another embodiment of a rotor blade 300 manufactured in accordance with aspects of the present subject matter. In particular, FIG. 8 illustrates a cross-sectional, spanwise view of the rotor blade 300. FIG. 9 illustrates a cross-sectional, chordwise view of the rotor blade 300.

In general, similar to the rotor blade 200 described above with reference to FIGS. 4 and 5, the illustrated rotor blade 300 may include a cover skin 302 (e.g., a laminate composite material) having an outer surface 304 defining the exterior surface of the rotor blade 300 and an inner surface 306 generally conforming to the profile of a volume of shaped filler material 308 disposed within the interior of the rotor blade 300. The filler material 308 (e.g., a low-density foam material) may generally define a profile corresponding to the aerodynamic profile of the rotor blade 300 and may be configured to occupy at least a portion of the inner volume of the rotor blade 300. As used herein with reference to FIGS. 8-11, the term "inner volume" refers to the volume of the rotor blade 300 defined by the inner surfaces 306 of the cover skin 302 which is not otherwise occupied by the support member 310 and the end cap 350. For example, in one embodiment, the filler material 208 may be configured to occupy greater than 50% of the inner volume of the rotor blade 300, such as by occupying greater than 75% of the inner volume or greater than 85% of the inner volume or greater than 95% of the inner volume. The rotor blade 300 may also include a pressure side 318 and a suction side 320 extending between a leading edge 322 and a trailing edge 324. Additionally, the rotor blade 300 may include a span 325 defining the total length between a blade root 312 and a blade tip 314 and a chord 326 defining the total length between the leading edge 322 and the trailing edge 324. Further, as indicated above, the filler material 308 and cover skin 302 of the rotor blade 300 may be configured so as to define an airfoil-shaped cross-section. Moreover, the rotor blade 300 may include additional aerodynamic features (e.g., by being aeroelastically tailored).

However, in contrast to the root sleeve 216 of the above described rotor blade 200, the illustrated rotor blade 300 may generally include an end plate 350 disposed at the blade root 312 of the rotor blade 300. In general, the end plate 350 may serve as an attachment mechanism for attaching the rotor blade 300 to the hub 18 (FIG. 1) of a wind turbine 10. Thus, it should be appreciated that the end plate 350 may generally be designed to have any suitable size, shape and/or configuration that permits the end plate 350 to be attached to a wind turbine hub 18. For example, in one embodiment, the end plate 350 may define a substantially cylindrical or circular shape having a diameter or height 352 generally corresponding to the diameter or height of a mounting flange (not shown) of the hub 18. Additionally, the end plate 350 may include a plurality of threaded rods 354 disposed annularly about a hub side 356 of the end plate 350 for attaching the rotor blade 300 to the hub 18. In other embodiments, the end plate 350 may include a plurality of annularly spaced holes (not shown) which define a bolt hole pattern generally corresponding to a bolt hole pattern defined the hub 18. Alternatively, it should be appreciated that the end plate 350 may be configured to be attached to the hub 18 using any other suitable means known in the art.

The end plate 350 of the disclosed rotor blade 300 may generally be formed from any suitable material. However, in several embodiments, the end plate 350 may be formed from a relatively stiff and/or durable material. For example, the end plate 350 may be formed from any suitable laminate composite materials (e.g., fiber-reinforced laminates), polymers (e.g., high strength plastics), metals (e.g., aluminum), wood or any other suitable materials or combinations of materials which are capable of withstanding the loading that typically occurs along the attachment point of the hub 18 and the rotor blade 300 during operation of a wind turbine 10.

Referring still to FIGS. 8 and 9, the rotor blade 300 may also include a support member 310 extending outwardly from the end plate 350 in a generally spanwise direction. For example, the support member 310 may be attached to the end plate 350 such that the support member 310 extends outwardly from a blade side 358 of the end plate 350 in the direction of the blade tip 314. It should be appreciated that the support member 310 may generally be configured to be attached to the end plate 350 using any suitable means. For instance, in the illustrated embodiment, the end plate 350 may define an opening 360 into which the support member 310 may be inserted and/or secured. In such an embodiment, it should be appreciated that the support member 310 may be secured within the opening 360 using any suitable attachment mechanism, such as screws, bolts, retaining clips, retaining brackets, adhesives, tapes and the like, and/or using any suitable attachment method, such as welding, press-fitting, bonding and the like. In another embodiment, the support member 310 may be configured to be attached to the blade side 358 of the end plate 350 and may extend outwardly therefrom, such as by using any of the attachment mechanisms and/or methods described above.

In general, the support member 310 may be configured similarly to the support members 210 described with reference to FIGS. 4 and 5. Thus, the support member 310 may be configured as a structural component for the disclosed rotor blade 300, such as by being configured to provide support for the filler material 308 during manufacturing of the rotor blade 300 and/or provide stiffness and/or strength to the rotor blade 300 during operation of the wind turbine 10. As such, it should be appreciated that the support member 310 may generally have any suitable shape, size, cross-section and/or configuration that permits the support member 310 to function as described herein.

For example, the support member 310 may generally be configured to extend lengthwise within the rotor blade 300 along at least a portion of the span 325 of the rotor blade 300. Thus, in the illustrated embodiment, the support member 310 may be configured to extend lengthwise within the rotor blade 300 from generally adjacent the blade root 312 to generally adjacent the blade tip 314. Additionally, as shown, the support member 310 may be configured as a rod or beam-like structural member. For example, in the illustrated embodiment, the support member 310 may be configured as a hollow rod or beam having a circular or tubular cross-sectional shape. However, it should be appreciated that, in alternative embodiments, the support member 310 may be configured as a solid and/or hollow component defining any suitable cross-sectional shape, such as an elliptical, triangular, rectangular or square shape. In further embodiments, the support member 310 may be configured as an "I" beam or may have any other suitable support beam configuration known in the art. For instance, in a particular embodiment of the present subject matter, the support member 310 may have configuration similar to the spar cap/shear web configuration utilized in conventional rotor blades.

Further, the support member 310 may generally define any suitable height 328 and chordwise width 330. For example, as particularly shown in FIG. 9, the support member 310 may have a height 328 and width 300 extending only partially between the pressure and suction sides 318, 320 and the leading and trailing edges 322, 324, respectively, of the rotor blade 300. However, in an alternative embodiment, the height 328 of the support member 310 may extend substantially between the pressure and suction sides 318, 320 of the rotor blade 300, such as by extending between the inner surfaces 306 of the cover skin 302. Similarly, in another embodiment, the support member 310 may have a chordwise width 330 extending substantially between the leading and trailing edges 322, 324 of the rotor blade 300.

It should be appreciated that, although the illustrated rotor blade 300 only includes a single support member 310, the rotor blade 300 may generally include any number of support members 310 extending outwardly from the end plate 350, such as two, three or more support members 310.

Referring now to FIG. 10, there is illustrated a cross-sectional view of the embodiment the support member 310 illustrated in FIGS. 8 and 9 having a blade blank 332 disposed thereon in accordance with aspects of the present subject matter. In general, the blade blank 332 may be configured similarly to the blade blank 232 described above with reference to FIG. 6. Thus, the blade blank 332 may generally comprise a volume of filler material 308 configured to be machined or shaped into the aerodynamic profile of the rotor blade 300. Thus, the blade blank 332 may generally define any suitable shape having dimensions equal to or greater than the span 325, maximum chord 326 and maximum height (not shown) of the rotor blade 300 such that portions of the filler material 308 forming the blade blank 332 may be removed in order to define the profile of the rotor blade. For instance, the length 334 of the blade blank 332 may generally be equal to or greater than the span 325 of the rotor blade 300. Similarly, the width 336 of the blade blank 332 may generally be equal to or greater than the maximum chord 326 of the rotor blade 300 and the height (now shown) of the blade blank 332 may generally be equal to or greater than the maximum height of the rotor bade 300. Additionally, as will be described below, in one embodiment, the support member 310 may have an initial length which is greater than the length 334 of the blade blank 332. Thus, as shown, an exposed end 362 of the support member 310 may generally extend outwardly from the blade blank 332 when the blade blank 332 is positioned into the support member 310.

Unlike the layered construction described above with reference to FIG. 6, the blade blank 332 shown in FIG. 10 is generally configured to be positioned onto and around the support member 310. For example, the blade blank 332 may define an opening (not shown) which generally corresponds to the cross-sectional shape of the support member 310 such that the blade blank 3332 may be positioned onto the support member 310. Additionally, the blade blank 332 may be configured to be attached to the support member 310 and/or the end plate 350. For example, in one embodiment, the blade blank 332 may be bonded to the outer perimeter of the support member 310 and the blade side 358 of the end plate 350 using any suitable adhesive. Further, it should be appreciated that, in several embodiments, the blade blank 332 may comprise a single, unitary mass of filler material 308. Alternatively, as shown in FIG. 10, the blade blank 332 may comprise a plurality of filler material segments 364 disposed along the length of the support member 310. In such an embodiment, the filler material segments 364 may be configured to be attached to one another in addition to being attached to the support member 310 and/or the end plate 350. For example, the filler material segments 364 may be bonded, adhered, tied, fastened or otherwise attached to one another using any suitable means.

Referring now to FIG. 11, there is illustrated a cross-sectional, spanwise view of one embodiment of the blade blank 332 illustrated in FIG. 10 after it has been shaped into the aerodynamic profile of the rotor blade 300. Specifically, once the blade blank 332 is positioned onto and around the support member 310, portions of the filler material 308 forming the blade blank 332 may be removed in order to define the profile of the rotor blade 300. For example, similar to the embodiment described above, the blade blank 332 may be machined or otherwise shaped to form the aerodynamic contours and profile of the pressure side 318, suction side 320, leading edge 322 and trailing edge 324 of the rotor blade 300. Thus, in one embodiment, the blade blank 332 may be shaped using any suitable machining process and any suitable machining equipment. Alternatively, the blade blank 332 may be shaped using any other suitable tools and/or equipment known in the art.

As indicated above, in one embodiment of the present subject matter, the support member 410 may have an initial length that is greater than the length 334 of the blade blank 332. In such an embodiment, it should be appreciated that this extended length may assist in machining or otherwise shaping the blade blank 332. For example, when the blade blank 332 is being machined using a CNC machine or other suitable machining equipment, the blade blank 332 may be supported within the machine at one end by the end plate 350 and at the other end by the exposed end 362 (FIG. 10) of the support member 310. Accordingly, to complete the formation of the aerodynamic profile of the rotor blade 300, the exposed end 362 of the support member 310 may be removed during or after the machining or shaping process. Thus, as shown in FIG. 7, the end 362 of the support member 310 may generally be removed, such as by being machined or trimmed, in order to form the tip 314 of the rotor blade 300.

It should be appreciated that, in an alternative embodiment of the present subject matter, one or more of the filler material segments 364 may be pre-machined or pre-formed into the aerodynamic profile of the rotor blade 300 prior to being assembled into the blade blank 332. For example, in the illustrated embodiment, each of the filler material segments 364 may be preformed to define a portion of the profile of the rotor blade 300 such that, once the blade blank 332 is formed (e.g., by assembling the filler material segments onto the support member 310), a complete aerodynamic profile is formed.

One of ordinary skill in the art should readily appreciate that various different combinations of the rotor blade components described herein may be utilized within the scope of the present subject matter. For example, the support member 310 described with reference to FIGS. 8-11 may also be utilized in the rotor blade 200 described with reference to FIGS. 4-7 instead of or in addition to the plurality of support members 210 and vice versa. Similarly, the end plate 350 and the root sleeve 216 may be used interchangeably or in combination to permit the disclosed rotor blades 200, 300 to be attached to the hub 18 of a wind turbine.

It should also be appreciated that, in several embodiments, the disclosed methods may be particularly advantageous for quickly and efficiently producing prototype rotor blades for testing new airfoil designs and the like. In particular, the disclosed methods provide for the manufacturing of rotor blades without the need for specialized, custom molds. As such, new airfoil shapes and/or other blade configurations/features (e.g., aero-elastically tailored blades, winglets and the like) may be manufactured and tested immediately, without the additional time required for creating and/or obtaining such specialized molds. However, the disclosed methods may also be utilized to produce rotor blades for use in the field. For example, rotor blades manufactured in accordance with the disclosed methods may be used as the primary and/or auxiliary rotor blades of a wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a rotor blade for a wind turbine, the method comprising:
    layering a plurality of support members between a plurality of filler material segments to form a blade blank;
    removing portions of both the plurality of filler material segments and the plurality of support members in order to shape the blade blank into a profile of the rotor blade; and
    positioning a skin around an outer perimeter of the shaped blade blank.

2. The method of claim 1, wherein the filler material segments are formed from a low-density material.

3. The method of claim 2, wherein the low-density material comprises a foam material.

4. The method of claim 1, wherein the plurality of support members are formed from a laminate composite material.

5. The method of claim 1, wherein each of the plurality of support members extends entirely between opposed inner surfaces of the skin.

6. The method of claim 1, further comprising forming a root sleeve directly onto a root end of the blade blank.

7. The method of claim 6, wherein the root sleeve is formed from a laminate composite material.

8. The method of claim 6, further comprising configuring the root sleeve for attachment to a hub of the wind turbine.

9. The method of claim 1, wherein the portions of both the plurality of filler material segments and the plurality of support members are removed using a machining process.

10. The method of claim 1, wherein an outer surface of the skin defines an exterior surface of the rotor blade.

11. The method of claim 1, wherein the skin comprises a laminate composite material.

12. The method of claim 1, further comprising removing additional portions of at least one of the plurality of filler material segments or the plurality of support members at a root end of the blade blank such that the root end defines a tapered profile.

13. The method of claim 12, further comprising positioning a root sleeve onto the root end of the blade blank, wherein the root sleeve defines a tapered width corresponding to the tapered profile of the root end.

14. The method of claim 1, wherein the plurality of support members and the plurality of filler material segments are layered such that the plurality of support members are spaced apart substantially equally within the blade blank.

15. The method of claim 1, wherein layering a plurality of support members between a plurality of filler material segments to form a blade blank comprises layering the plurality of support members between the plurality of filler material segments in a chordwise direction such that each of the plurality of support members extends end-to-end substantially perpendicularly to a chord of the rotor blade.

16. The method of claim 1, wherein the blade blank defines a substantially solid cross-section.

* * * * *